United States Patent [19]
Orsos

[11] Patent Number: 4,918,827
[45] Date of Patent: Apr. 24, 1990

[54] DEVICE FOR DETERMING THE OPERATING TEMPERATURE RANGE OF A SPARK PLUG

[76] Inventor: John H. Orsos, Manuel Gonzales de la Rosa #473,, Lima 17, Peru

[21] Appl. No.: 262,689

[22] Filed: Oct. 26, 1988

[51] Int. Cl.⁵ .......................... G01B 5/02; G01B 5/18
[52] U.S. Cl. ...................................... 33/836; 33/600; 33/833
[58] Field of Search ................ 33/832, 833, 836, 600

[56] References Cited

U.S. PATENT DOCUMENTS

| | | | |
|---|---|---|---|
| 435,311 | 8/1890 | Lambert | 33/836 |
| 1,009,605 | 11/1911 | Walker | 33/836 |
| 1,235,785 | 8/1917 | Fishel | 33/836 |
| 2,400,371 | 5/1946 | Reeser | 33/836 |
| 2,650,435 | 9/1953 | Kidd | 33/836 |
| 2,654,156 | 10/1953 | Boyer | 33/836 |
| 2,910,779 | 11/1959 | Patton | 33/836 |
| 3,559,292 | 2/1971 | Weissman | 33/514 |
| 4,121,572 | 10/1978 | Krzeminski | 33/836 |
| 4,216,585 | 8/1980 | Hatter | 33/836 |
| 4,342,153 | 8/1982 | Cole | 33/836 |
| 4,473,952 | 10/1984 | Mariani | 33/836 |
| 4,498,244 | 2/1985 | Bendickson et al. | 33/600 |
| 4,510,691 | 4/1985 | Meyer | 33/556 |
| 4,519,144 | 5/1985 | Larsen | 33/836 |

FOREIGN PATENT DOCUMENTS

| | | | |
|---|---|---|---|
| 2700596 | 7/1978 | Fed. Rep. of Germany | 33/836 |
| 1010000 | 6/1952 | France | 33/836 |
| 56-163402 | 12/1981 | Japan | 33/836 |
| 60-105901 | 6/1985 | Japan | 33/832 |
| 92727 | 1/1922 | Switzerland | 33/836 |
| 248521 | 2/1948 | Switzerland | 33/836 |

Primary Examiner—William A. Cuchlinski, Jr.
Assistant Examiner—Diego F. F. Gutierrez
Attorney, Agent, or Firm—Norman B. Rainer

[57] ABSTRACT

A hand-manipulated device is provided for ascertaining the operating temperature range of a spark plug by measuring the length of the ceramic insulator component of the spark plug. The device is comprised of an elongated probe rod slideably held by a holder having a scale. In use, the tip of the holder is placed upon the upper extremity of the ceramic insulator, and the probe rod is extended downwardly until it contacts the base of the insulator. The length of the probe rod thus extended is shown by an indicator interactive with the scale.

4 Claims, 2 Drawing Sheets

DEVICE FOR DETERMING THE OPERATING TEMPERATURE RANGE OF A SPARK PLUG

BACKGROUND OF THE INVENTION

This invention relates to the determination of spark plug characteristics, and more particularly concerns a device which ascertains the operating temperature range of the spark plug.

Most spark plugs, as used in internal combustion engines, are comprised of an upper terminal, and a centered metal rod extending from said upper terminals to a spark gap positioned at the opposite extremity of the spark plug. The centered rod is embedded within a ceramic insulator of generally conical shape convergently tapered in the direction of the spark gap. The ceramic insulator terminates in an extremity through which the centered rod protrudes. A cylindrical metal sleeve surrounds the ceramic insulator adjacent the spark gap, said sleeve having a threaded exterior surface adapted to tightly engage appropriately positioned holes in the cylinder head of the engine. The spark gap is comprised of the lowermost extremity of the centered rod, emergent from the ceramic insulator and fashioned in a flat surface perpendicular to the rod axis, and an electrode attached to the sleeve and extending laterally to a position closely below the centered rod. The sleeve forms with the insulator a V-shaped annular trough centered upon the axis of the spark plug.

Each engine requires spark plugs having critically designed characteristics such as the width of the spark gap and the temperature range in which the spark plug is intended to operate. In the case of new spark plugs of uncertain manufacture, and in the case of used spark plugs wherein indicia specifying the characteristics of the spark plug have been obliterated, the operating temperature range of the spark plug is not readily apparent. It is also difficult to ascertain that a potential replacement spark plug of one manufacturer is equivalent in its heat range to the original spark plug, which may have been made by a different manufacurer.

It is accordingly an object of the present invention to provide means for quickly and easily ascertaining the thermal operating range of spark plugs of various manufacturer.

It is another object of this invention to provide a device useful in accordance with the foregoing object and adapted for manual hand-held operation.

It is a further object of the present invention to provide a device of the aforesaid nature of simple and rugged construction amenable to low cost manufacture.

These objects and other objects and advantages of the invention will be apparent from the following description.

SUMMARY OF THE INVENTION

The above and other beneficial objects and advantages are accomplished in accordance with the present invention by a device adapted to measure the length of the conical surface of the ceramic insulator centered within the threaded sleeve of a spark plug, said device comprising:

(a) an elongated probe rod having upper and lower extremities,
(b) control means associated with said upper extremity and disposed perpendicularly to the axis of the probe rod,
(c) indicator means disposed perpendicularly to the axis of the
probe rod between said extremities,
(d) a holder having retainer means which accommodates said
probe rod in a manner to permit sliding movement of the probe
rod in the direction of its axis, said retainer means having
upper and lower extremities from which said probe rod
protrudes, said lower extremity being configured as a narrow
abutment tip, and
(e) scale means adapted to interact with said indicator means.

In use, the abutment tip is placed upon the extremity of the ceramic insulator of the spark plug, the probe rod is pushed downward until it seats in the bottom of the V-shaped trough, and the length of the probe rod protruding from the abutment tip is shown on the scale by the indicator means. The device of this invention is based in part upon the observation that the heat range of a spark plug can be determined by measuring the length of the side of the conically shaped ceramic insulator centered within the threaded sleeve of the spark plug. The length measured is the distance between the base of the ceramic insulator located with the V-shaped trough formed with the threaded sleeve, and the extremity of the insulator, said length being measured upon the conical side surface along a line which is coplanar with the center axis of the insulator.

In a preferred embodiment of the device, the holder is of integral monolithic construction, having been fabricated of thermoplastic by an injection molding operation. A bent portion of the probe rod adjacent its upper extremity may serve as both control and indicator means. In certain embodiments the probe rod may fit within the retainer means with sufficient frictional force to prevent gravity induced movement, thereby facilitating the reading of a measurement even after the device is removed from the spark plug. The nature of the scale is such that it indicates hotter operating ranges of the spark plug with greater lengths of the ceramic insulator.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawings.

DESCRIPTION OF THE PREFERRED EMBODIMENT

Figure 1:
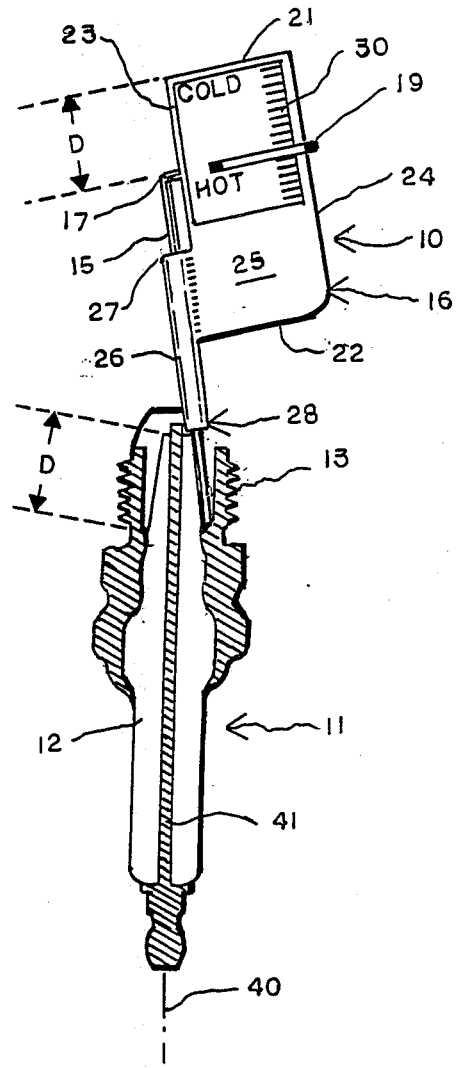
FIG. 1 is a front view of an embodiment of the device of the present invention shown in operative association with a spark plug.
Figure 2:
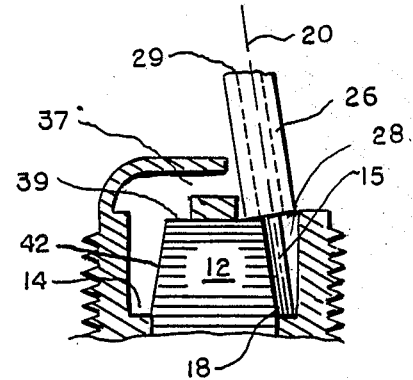
FIG. 2 is an enlarged fragmentary view of the embodiment of FIG. 1.
Figure 3:
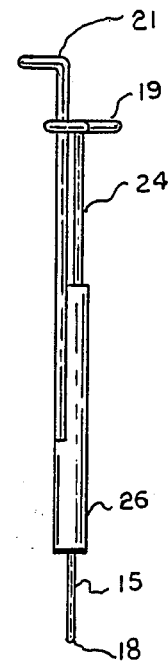
FIG. 3 is a side view taken from the right side of the embodiment of FIG. 1.
Figure 4:
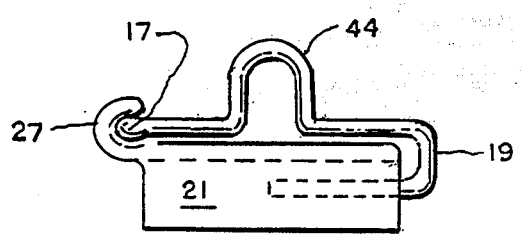
FIG. 4 is an enlarged top view of the embodiment of FIG. 1.

Referring to FIGS. 1-4, an embodiment of a device 10 of the present invention is shown in functional relationship with a spark plug 11 having a ceramic insulator 12, threaded sleeve 13 and V-shaped trough 14 adjacent spark gap 37. The spark plug has an axis of elongation 40 upon which are centered a conductor rod 41 and ceramic insulator 12 which surrounds rod 41. The portion of the ceramic insulator within sleeve 13 has the shape of a conical sector bounded by side surface 42 which, in sectional view, is angled with respect to axis 40, said angle being the angle of convergence of the cone.

The exemplified embodiment of device 10 is comprised of two major components, namely probe rod 15 and holder 16. Said probe rod is an elongated straight rigid member having upper and lower extremities 17 and 18, respectively. Upper extremity 17 has associated therewith control means in the form of portion 19 bent so as to extend perpendicularly to the axis 20 of the probe rod. As will hereinafter be shown, portion 19 facilitates manipulation of the probe rod by finger pressure.

Holder 16 is a monolithic structure having top and bottom edges 21 and 22, respectively, opposed side edges 23 and 24, and flat front face 25. Retainer means in the form of tube portion 26 is disposed upon side edge 23 as a continuous integral extension thereof. Tube portion 26 has an upper extremity 27, a lower extremity 28 located below bottom edge 22, and a centered bore 29 adapted to slidably accommodate rod 15. Lower extremity 28 is sufficiently narrow to serve as an abutment tip adapted to rest upon the terminal portion 39 of the ceramic insulator in the manner shown in FIGS. 1 and 2.

Scale means in the form of a series of parallel markings 30 is disposed upon front face 25 in generally perpendicular disposition to the axis of probe rod 15. Indicia associated with the markings additionally indicate cold and hot operating ranges of spark plugs. The distance D shown in FIG. 1 is the length of the ceramic insulator, measured along its side surface 42, and corresponds to the distance which bent portion 19 has descended upon scale 30. Bent portion 19 of the probe rod of the embodiment of FIGS. 1-4 further serves as an indicator means which aligns with markings on the scale means, and additionally wraps around the holder means to provide a stabilizing effect. A loop 44, formed in bent portion 19 at the rear of holder 16, serves to facilitate finger manipulation of the probe rod.

Figure 5:
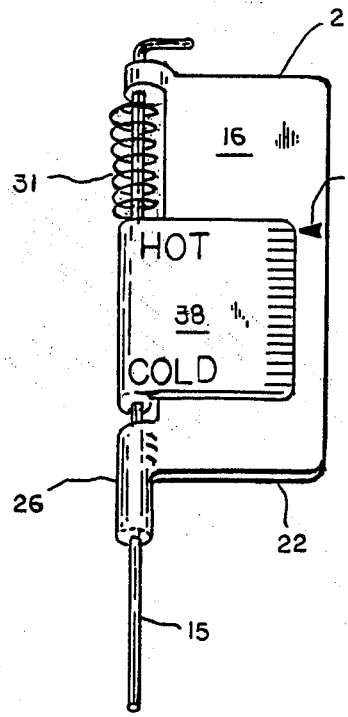
FIG. 5 is a front perspective view of a first alternative embodiment of the device of this invention.

In the first alternative embodiment, shown in FIG. 5, the probe rod is adapted to remain motionless during use, scale means 38 is attached to the probe rod, and the holder is adapted to slide upon the probe rod. A coil spring 31 restores the holder to the upper, bent extremity of the probe rod. Because of the inverse relative movement of the components of this embodiment in comparison with the embodiment of FIGS. 1-4, it is to be noted that the positions of the hot and cold indicia are reversed. The indicator means in this embodiment is an arrow 45 imprinted upon the front face of holder 16.

Figure 6:
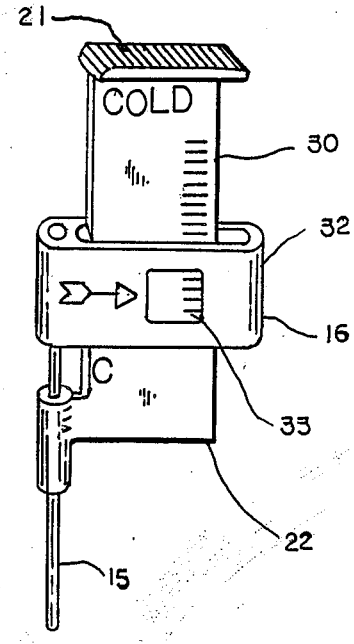
FIG. 6 is a front perspective view of a second alternative embodiment of the device.

In the second alternative embodiment shown in FIG. 6, indicator means 32 is a flat sleeve-like member which attaches to the upper extremity of the probe rod, and slidably embraces the holder. A window 33 in said indicator means facilitates interaction with scale means 30.

Figure 7:
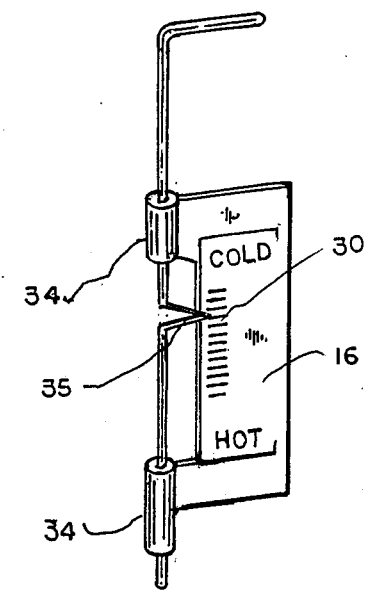
FIG. 7 is a front perspective view of a third alternative embodiment.

In the third alternative embodiment shown in FIG. 7, the retainer means is in the form of separated aligned tube portions 34, and the indicator means is in the form of a sharply bent portion 35 of the probe rod that serves as a pointer directed toward scale means 30.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device for measuring the length of the conical surface of the ceramic insulator centered within the threaded sleeve of a spark plug, said device comprising:
   (a) an elongated probe rod having upper and lower extremities,
   (b) indicator means movably associated with said probe rod,
   (c) a holder having retainer means which accommodates said probe rod in a manner to permit sliding movement of the probe rod in the direction of its axis, said retainer means having upper and lower extremities from which said probe rod protrudes, said lower extremity being configured as a narrow abutment tip,
   (d) scale means adapted to interact with said indicator means,
   (e) control means associated with the upper extremity of said probe rod, and
   (f) a bent portion adjacent the upper extremity of said probe rod, said bent portion functioning as both control means and indicator means.

2. The device of claim 1, wherein said bent portion wraps around the holder to provide a stabilizing effect.

3. The device of claim 2 wherein a loop is disposed in said bent portion at the rear of said holder, said loop serving to facilitate finger manipulation of the probe rod.

4. A device for measuring the length of the conical surface of the ceramic insulator centered within the threaded sleeve of a spark plug, said device comprising:
   (a) an elongated probe rod having upper and lower extremities,
   (b) indicator means movably associated with said probe rod,
   (c) a holder having retainer means which accommodates said probe rod in a manner to permit sliding movement of the probe rod in the direction of its axis, said retainer means having upper and lower extremities from which said probe rod protrudes, said lower extremity being configured as a narrow abutment tip, and
   (d) scale means adapted to interact with said indicator means, said scale means being such as to indicate hotter operating ranges of the spark plug with greater lengths of the ceramic insulator.

* * * * *